(12) United States Patent
Huang et al.

(10) Patent No.: US 7,337,376 B2
(45) Date of Patent: Feb. 26, 2008

(54) METHOD AND SYSTEM OF SELF-TEST FOR A SINGLE INFRARED MACHINE

(75) Inventors: Chung-Wen Huang, Taipei (TW); Shun-Hsien Chao, Taipei (TW)

(73) Assignee: Inventec Corporation, Taipei (TW)

( * ) Notice: Subject to any disclaimer, the term of this patent is extended or adjusted under 35 U.S.C. 154(b) by 224 days.

(21) Appl. No.: 10/860,952

(22) Filed: Jun. 4, 2004

(65) Prior Publication Data
US 2005/0269498 A1 Dec. 8, 2005

(51) Int. Cl.
*G01R 31/28* (2006.01)
(52) U.S. Cl. .................... 714/715; 714/724
(58) Field of Classification Search ............ 714/25, 714/715
See application file for complete search history.

(56) References Cited

U.S. PATENT DOCUMENTS

| | | | |
|---|---|---|---|
| 6,587,972 B1* | 7/2003 | Baird et al. ............... 714/48 |
| 6,681,142 B2* | 1/2004 | Schinkowitsch ........... 700/108 |
| 2003/0023900 A1* | 1/2003 | Smith et al. ............... 714/25 |
| 2004/0153773 A1* | 8/2004 | Woo et al. ................. 714/25 |
| 2004/0204191 A1* | 10/2004 | Raviv ...................... 455/575.1 |
| 2005/0007613 A1* | 1/2005 | Fritz et al. ................ 358/1.13 |
| 2005/0060436 A1* | 3/2005 | Kienhoefer ............... 710/1 |
| 2005/0249230 A1* | 11/2005 | Bennett et al. ............ 370/428 |

OTHER PUBLICATIONS

Charlot, B.; Mir, S.; Parrain, F.; Courtois, B., "Electrically induced stimuli for MEMs self-test," VLSI Test Symposium, 19th IEEE Proceedings on. VTS 2001 , vol., No. pp. 210-215, 2001.*

* cited by examiner

*Primary Examiner*—Cynthia Britt
(74) *Attorney, Agent, or Firm*—Apex Juris, pllc; Tracy M Heims

(57) ABSTRACT

A system and method of self-test for a single infrared machine. An infrared transimit circuit may be set up succesfully by only using a host with an external infrared module without a use of another test machine. A test procedure is excuted through the infrared transmit circuit to ascertain the function of the infrared module in the host is properly functioning.

12 Claims, 4 Drawing Sheets

METHOD AND SYSTEM OF SELF-TEST FOR A SINGLE INFRARED MACHINE

FIELD OF INVENTION

The present invention is related to a test system and method of a transmitting interface. More particularly, the present invention is related to a system and method of self-test for a single infrared machine.

RELATED ART

Infrared transmitting technology is the most generally used short distance wireless transmitting method in those wireless applications of an executable platform of a computer. This is because infrared transmitting has characteristics of low power consumption, low costs, high transmittance and point-to-point communication, which are especially suitable to be used in those portable battery-powered products. At present, infrared transmit technology has a wide range of applications, such as a digital camera (DC), digital video (DV), personal digital assistant (PDA), infrared multi-function laser, printer, infrared printer, tablet PC, note book and desktop computer. Therefore, infrared transmitting has drawn a good deal of attention from many fields and dominated the wireless transmit market.

For an infrared module product popular in the market, a test apparatus for both an engineering sample and mass production in the course of its manufacturing is required. The test apparatus has a test procedure requiring an infrared transmit circuit, which is generally limited by many characteristics of the infrared ray, such as a small transmitting angle, no transmittance of a real object, still infrared transmit module required upon transmitting and receiving and no multi-points transmission.

The test procedure of the currently used infrared module for function test has two primary steps: (1) setting up an infrared transmit circuit and (2) executing the test procedure by the infrared transmit circuit to ascertain proper running of the to-be-tested infrared module. The mentioned test steps will be illustrated in connection with illustration of connection and operation of a prior infrared test as shown in FIG. 1.

(1) Setting up an infrared transmit circuit. According to the infrared transmit specification, the infrared ray has a maximum effective transmitting distance of one meter. In this regard, a host 20 and a test machine 30 are set up parallel with a one meter separation. Then, activating a first infrared module 22 in the host 20 and an external infrared module 32 in the test machine 30; executing network setup, such as a network communication protocol, or network sharing and transmitting mode of the infrared transmit circuit through an application program. The step of setting up the infrared transmit circuit is proceeded to bridge communication of the first infrared module 22 and the external infrared module 32.

(2) Executing the test procedure to ascertain that the function of the infrared module to be tested is proper. The test is launched by transmitting some test data provided by the host 20 through the first infrared module 22 included in the host 20; receiving the test data from the external infrared module 32 included in the test machine 30' and ascertaining that the transmitted and received test data file through the mentioned application program are the same, i.e., ascertaining that the first infrared module 22 included in the host 20 has a normal 'transmitting function'.

Next transmitting some test data provided by the test machine 30 through the external infrared module 32 included in the test machine 30; receiving the test data from the first infrared module 22 included in the host 20, and ascertaining that the transmitted and received test data file through the mentioned application program are the same, i.e., ascertaining that the first infrared module 22 included in the host 20 has a normal 'receiving function'.

However, the prior infrared transmit circuit still has some problems to be solved, which are stated as follows.

First, the setup operation of the infrared transmit circuit is more expensive, since the prior infrared transmit circuit requires a host and a test machine. When the host and the test machine are note book PCs, the costs for setup of the infrared transmit circuit may be up to at least tens of thousands. Further, since there is no multi-points transmission, setup for the infrared transmit circuit may cost even hundreds of thousands when multiple test machines are at the same time used in a mass production stage for production speed.

Second, a room for setup may not be efficiently saved. Since the infrared ray are not able to pass through a real object, there may not be any blockade in the room for the setup of the infrared transmit circuit. Therefore, needing a specific test room also causes inefficient spacial utilization.

Third, an operating time is not efficiently used. Since two machines are required to execute a test procedure at one time, twice the time is needed for the associated setup in the infrared transmit circuit, a waste of time. In addition, since the prior test needs to transmit test data from the host and the test machine respectively, the infrared ray has the maximum efficient transmitting distance of one meter and the working infrared transmit modules are required to be still upon transmitting and receiving data; the operator thus needs to run between the two machines, which is also wasteful.

Fourth, a debugging speed is reduced. Since two machines are required to be used for the test operation, there may be more operational problems in the test operation when tests fail. In view of the reasons mentioned above, there is a need for providing a system and method of self-test for a single infrared machine so to reduce costs and increase efficiency.

SUMMARY OF THE INVENTION

In view of the disadvantages of the wasted time, room and cost problems, the present invention provide a self-test system and method for a single infrared machine.

To achieve the purpose as stated, the self-test system for the single infrared machine in the present invention comprises: a host, a display module, a first infrared module, a second infrared module and a transmitting/receiving monitoring module.

In the system, an infrared transmit circuit is generated by connecting the first infrared module to the host and the second infrared module through a universal serial bus (USB) therebetween. A user executes associated settings by a display module through a transmitting/receiving monitoring module, ascertains the function of the first infrared module based on the result of a test procedure, and displays a plurality of transmitting states and a transmitting mode of the infrared transmit circuit when the mentioned test program is executed.

A method self-test method for a single infrared machine according to the present invention comprises the steps: receiving a connection signal generated by connecting a second infrared module to the host through the USB and prompting the host to receive a connection signal. Generating an infrared transmit circuit by activating the first and second infrared modules by the host, based on the mentioned connection signal. Executing the transmission and receiving of test data through mentioned infrared circuit based, on associated settings and a trigger instruction generated in a transmitting/receiving monitoring module. Comparing the transmitted and received data to each other and ascertaining that the first infrared display module is properly functioning when the transmitted and received test data are consistent.

It will be understood that the foregoing summary encompasses some of the many features of the invention, and does not constitute an exhaustive description of all the aspects of the invention. Therefore, the summary of the invention should not be construed in a way to limit the scope of the invention as described in the claims. To provide a further understanding of the invention, the following detailed description illustrates embodiments and examples of the invention.

BRIEF DESCRIPTION OF THE DRAWINGS

The present invention will become more fully understood from the detailed description given hereinbelow for illustration only, and thus is not limitative of the present invention, and.

DETAILED DESCRIPTION OF THE INVENTION

A self test system and method for a single infrared machine is disclosed in the present invention. An infrared transimit circuit is set up succesfully by only using a host with an external infrared module, without the use of another test machine. A test procedure is excuted through the infrared transmit circuit, to ascertain that the infrared module in the host is properly functioning.

Figure 1:
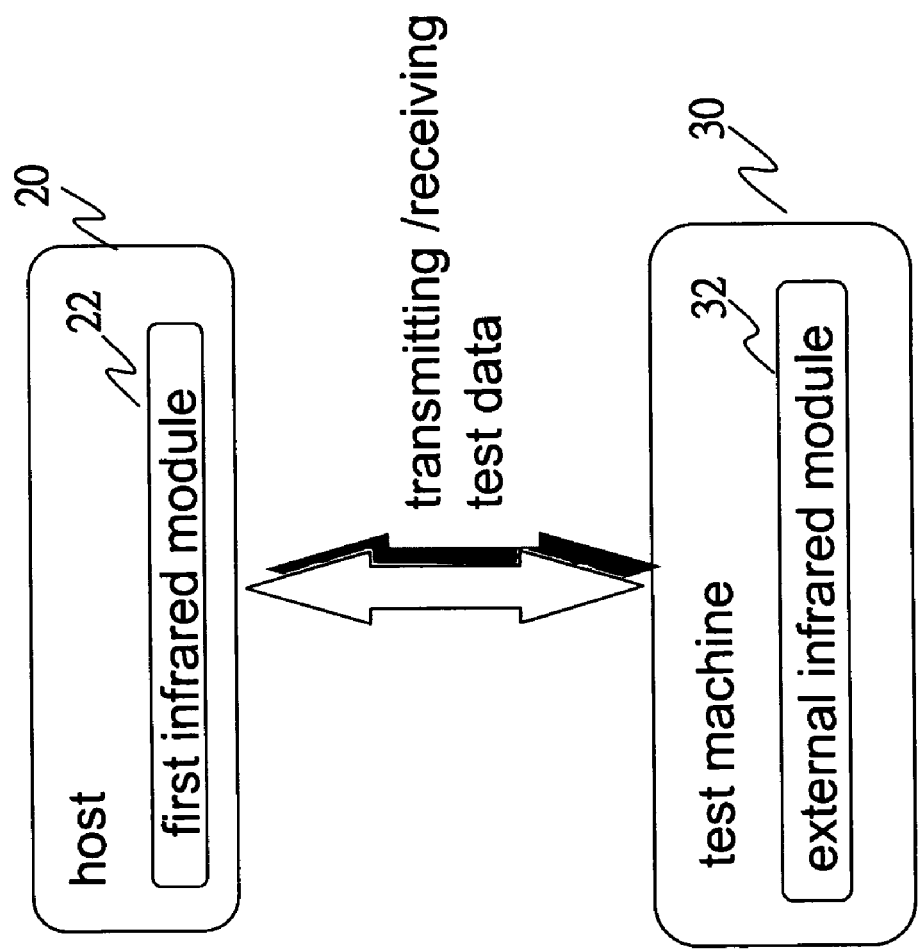
FIG. 1 is an illustration of connection and operation of a test of a prior infrared module.
Figure 2:
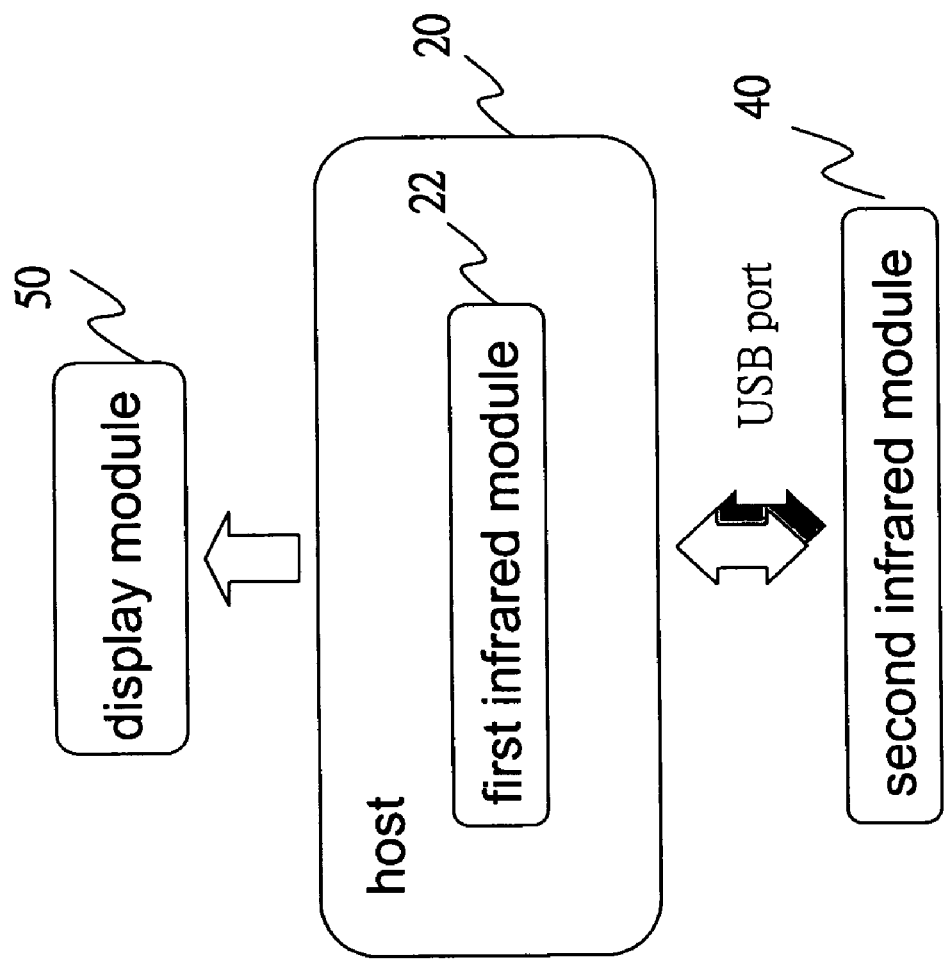
FIG. 2 is an illustration of connection of a system of a self test infrared module according to the present invention.
Figure 3:
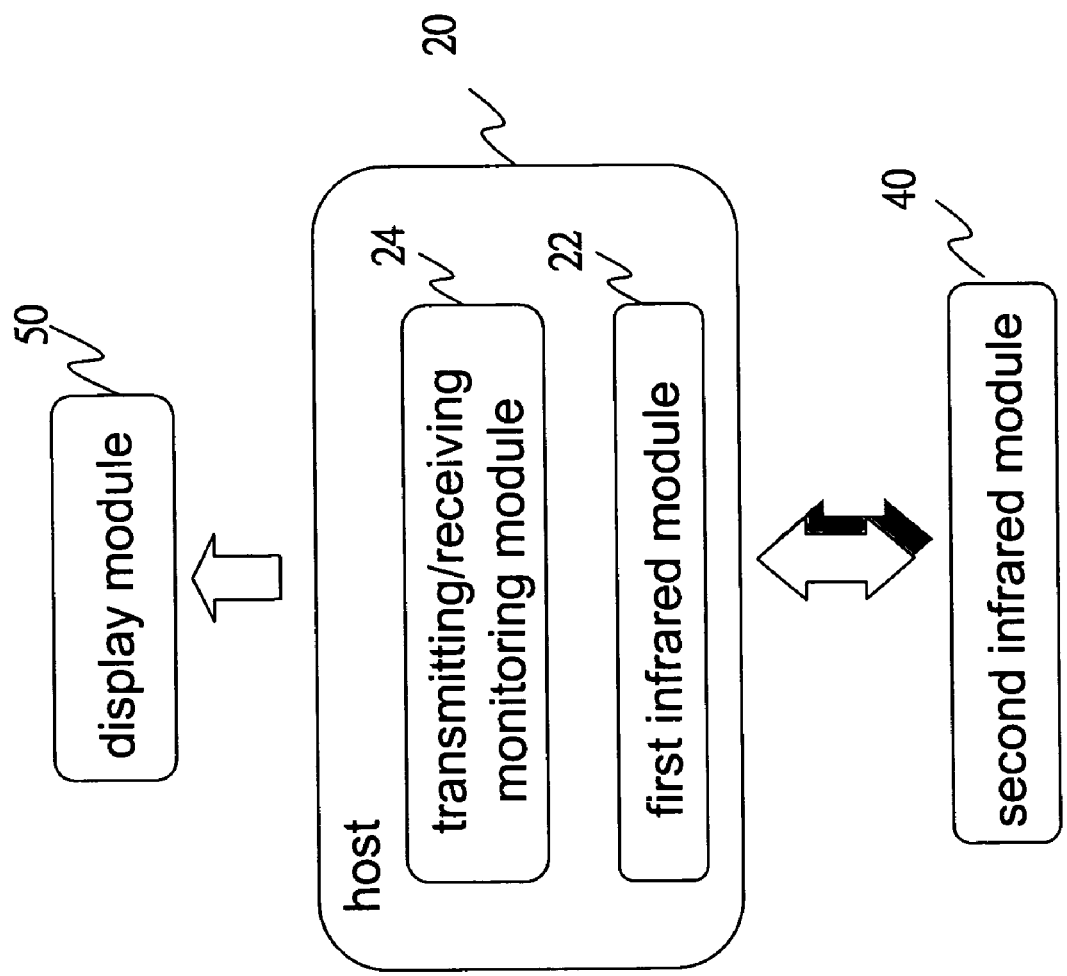
FIG. 3 is an illustration of operation of a self test system of the infrared module according to the present invention.
Figure 4:
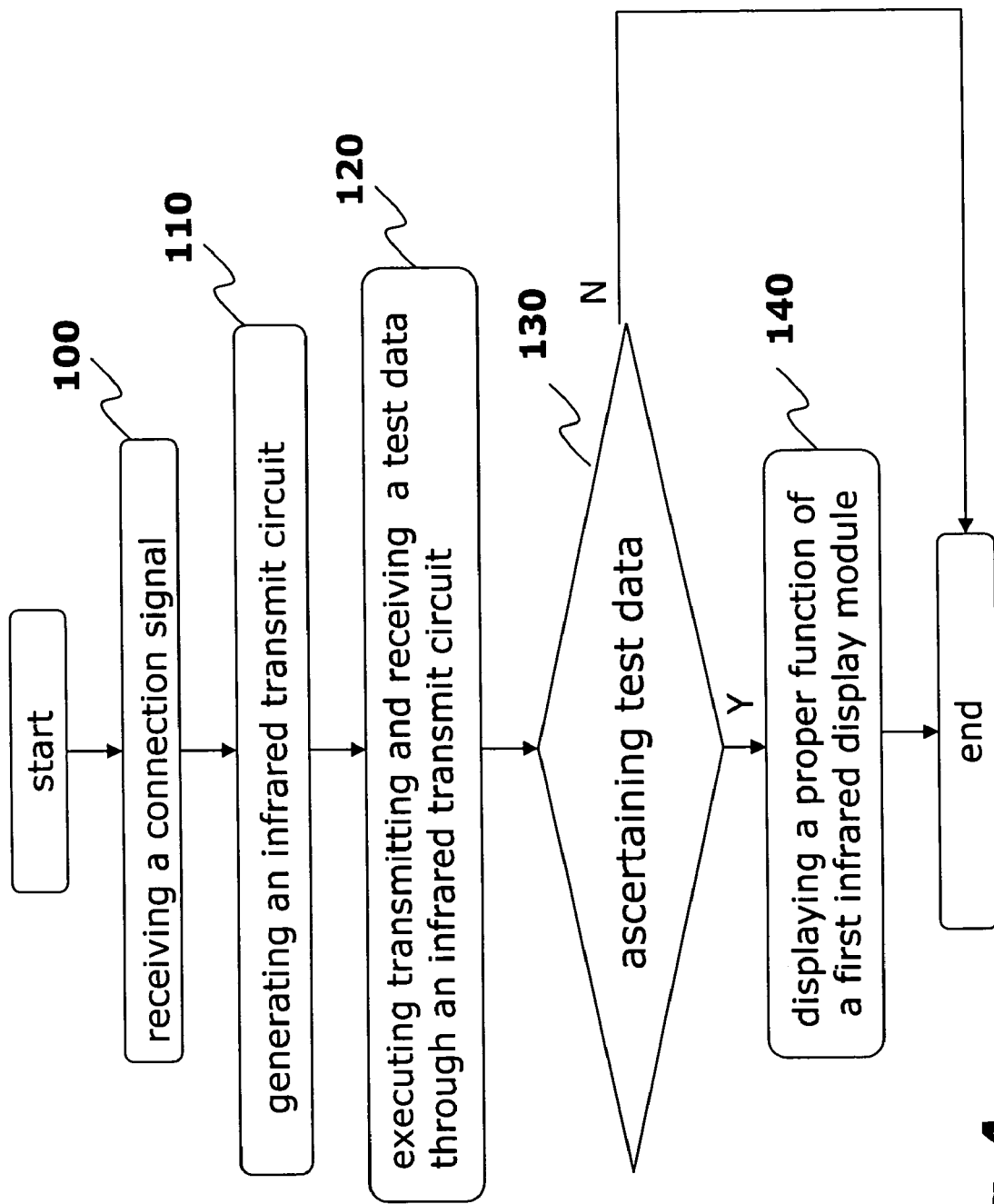
FIG. 4 is a flowchart of a self test method of the infrared module according to the present invention.

FIG. 2 is an illustration of the connection of a self test system of an infrared module disclosed in the present invention. FIG. 3 is an illustration of operation of the self test system of the infrared module according to the present invention. FIG. 4 is a flowchart of a self test method of the infrared module according to the present invention. Referring to FIG. 2. In FIG. 2, connecting a second infrared module 40 to a host 20 through a universal serial bus (USB) forming an infrared transmit circuit with a first infrared module 22 in a host 20 with associated proper network settings used for a test procedure.

FIG. 3 is an illustration of operation of the self test system of the infrared module according to the present invention.

The system has the following primary functional modules: a host 20, first infrared module 22, second infrared module 40, transmitting/receiving monitoring module 24 and display module 50, which are respectively explained as follows.

The host 20 has the first infrared module 22 to be tested and provides test data (n and n1) generated and transmitted and received in the test procedure. In addition, the host 20 has at least a USB.

First infrared module 22 has to test if the module is properly functioned. The first infrared module 22 transmits the test data (n) provided by the host 20 to the second infrared module 40 and receives the test data (n1) transmitted by the host 20 to the second infrared module 40.

The second infrared module 40 is connected to the host 20 through the USB. The second infrared module 40 receives the test data (n) transmitted by the first infrared module 22 and receives the test data (n1) transmitted by the host 20 to the first infrared module 22.

Further, the second infrared module 40 has a transmitter/receiver, a transform control circuit, a connection wire and a USB terminal. The transmitter/receiver is used to transmit/receive the infrared test data signal. The transform control circuit is connected to the transmitter/receiver and a transforming medium for transformation of electronic signals in the USB and the infrared signal is transmitted and received. The transform control circuit has a plurality of light emitting diodes (LEDs) used to display a transmitting mode of the infrared transmit circuit. The connection wire is connected to the transform control circuit and has a length at least keeping the first infrared module 22 and the second infrared module 40, as such separated by a maximum effective transmitting distance, which is a specific infrared transmission, to ascertain that the first infrared module 22 has a normal function in the maximum effective transmitting distance. The USB terminal is connected to the mentioned connection wire and serves the USB through which the second infrared module 40 is connected to the host 20.

A connection signal is generated by the second infrared module 40, connecting to the host 20. The connection signal serves as an activation signal to activate the first infrared module 22 and the second infrared module 40, to form an infrared transmission circuit.

The transmitting/receiving monitoring module 24 is a user interface located at the host 20. Through the transmitting/receiving-monitoring module 24, a user can give settings needed in the test operation and acquire information of some associated transmitting states in the test procedure.

The associated settings comprise: (a) the transmitting mode of the infrared transmit circuit being set to be FIr(Fast Ir) or Sir; (b) the network settings needed for the infrared transmit circuit, such as a network communication protocol and network sharing; and (c) a generation of a trigger signal prompting the test procedure.

The information of the associated transmitting states comprises: (a) the current transmitting mode of the infrared transmit circuit; (b) a transmitted amount of mentioned test data file, (c) an un-transmitted amount of mentioned test data file, (d) a scheduled time in which the transmission of mentioned test data is finished, (e) a time in which the transmission of mentioned test data is finished, and (f) a consistency between mentioned transmitted and received test data, wherein the information in the (f) state indicate if the first infrared module 22 in the host 20 is properly functioned.

The transmitting/receiving-monitoring module 24 further compares the transmitted and received test data (n and n1) file to each other. When the transmitted and received test data (n &n1) are consistent, the transmitting/receiving-monitoring module 24 displays information of data consistency to indicate if the first infrared module 22 is properly functioned.

The display module 50 is used to display information of the user interface of the transmitting/receiving monitoring module 24 in the host 20.

FIG. 4 is a flowchart of a self test method of the infrared module according to the present invention, which is illustrated as follows.

The host 20 receives a connection signal of the second infrared module 40 connecting to the host 20 through the USB (step 100). The connection signal prompts the first infrared module 22 in the host 20 and the second infrared module, 40 to activate an infrared transmission circuit (step 10). Based on the associated settings in the transmitting/receiving monitoring module 24, the transmitting/receiving monitoring module 24 generates a trigger instruction, prompting the first infrared module 22, to transmit test data (n), provided by the host 20 and receive the test data (n) through the second infrared module 40. Next, the second infrared module 40 transmits the test data (n1) provided by the host 20 and the first infrared module 22 receives the test data (n1) (step 120). The transmitting/receiving-monitoring module 24 respectively checks if the volume of the transmitted and the received data is consistent, and then executes the following steps (step 130):

If not consistent: ending the test procedure;

If consistent: displaying the consistency by the transmitting/receiving-monitoring module 24 as an indication that the to-be-tested first infrared module 22 is functioning properly and as an reference for the user (step 140).

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An infrared test system comprising:
    a host, generating test data, the host comprising a first infrared module to be tested and a transmitting/receiving monitoring module;
    a second infrared module, connecting to the host through a universal serial bus (USB) and forming an infrared transmission circuit with the first infrared module; and;
    a display module, displaying information of the transmitting/receiving monitoring module
    wherein, the first infrared module receives the test data from the host and transmits to the second infrared module via the infrared transmission circuit, the second infrared module transmits the test data transmitted from the first infrared module to the host via the USB, the transmitting/receiving monitoring module compares the test data transmitted by the first infrared module with the test data received via the USB by the host from the second infrared module and displays the information of data consistency on the display module, then the second infrared module receives the test data via the USB from the host and transmits to the first infrared module via the infrared transmission circuit, and the transmitting/receiving monitoring module compares the test data transmitted by the second infrared module with the test data received by the first infrared module and displays the information of data consistency on the display module.

2. The infrared test system of claim 1, wherein the second infrared module comprises:
    a transmitter transmitting the test data via the infrared transmission circuit;
    a receiver, receiving the test data via the infrared transmission circuit
    a connection wire, connecting the host and the second infrared module;
    a USB port terminal, connecting the host and the connection wire; and
    a transform control circuit, connected to the transmitter and the receiver, the transform control circuit connected to the host and the second infrared module via the connection wire, the transform control circuit transforming electronic signals in the USB between the host and the second infrared module for the transmitter and receiver to be transmitted and received.

3. The infrared test system of claim 2, wherein said connection wire has a length at least capable of keeping the first and second infrared modules from each other with a maximum effective infrared transmitting distance.

4. The infrared test system of claim 1, wherein said transform control circuit further comprises a plurality of light emitting diodes (LEDs) used for displaying transmitting mode of the infrared transmission circuit.

5. The infrared test system of claim 4, wherein said transmitting mode of the infrared transmission circuit comprises FIr (Fast Ir) and SIr (Slow Ir).

6. The infrared test system of claim 1, wherein when connecting to the host, the second infrared module generates a connection signal to activate the first and the second infrared module to form the infrared transmission circuit.

7. The infrared test system of claim 1, wherein the information of the transmitting/receiving monitoring module comprises a current transmitting mode of the infrared transmit circuit, a transmitted amount of the test data file, an un-transmitted amount of the test data file, a scheduled time of finishing transmitting of the test data, a time of finished transmitting of the test data, and a consistency between the transmitted and received test data.

8. The infrared test system of claim 1, wherein the transmitting/receiving monitoring module generates a trigger instruction to the first and second infrared modules to start to transmit and receive the test data via the infrared transmission circuit.

9. A test method of a first infrared module of a host, the host being connected to a second infrared module through a universal serial bus (USB), the host generating a test data to be transmitted to said first and second infrared modules, the test method comprising steps of:
    generating a connection signal to activate the first and the second infrared modules when the second infrared module is connected to the host;
    forming an infrared transmission circuit between the first infrared module and the second infrared module;
    transmitting and receiving the test data via the infrared transmission circuit, the first infrared module receiving the test data from the host and transmitting to the second infrared module via the infrared transmission circuit, the second infrared module transmitting the test data transmitted from the first infrared module to the host via the USB, comparing the test data transmitted by the first infrared module with the test data received via the USB by the host from the second infrared module,
    then the second infrared module receiving the test data via the USB from the host and transmitting said received test data to the first infrared module via the infrared transmission circuit;
    comparing the test data transmitted by the second infrared module with the test data received by the first infrared module;
    and displaying the data consistency between the transmitted test data and received test data on a display module.

10. The test method of claim 9, wherein the host is selected from a group consisting of a digital camera (DC), a digital video (DV), a personal digital assistant (PDA), a multi-function infrared laser printer, a tablet PC, a note book PC and a desktop PC.

11. The test method of claim 9, further comprising a step of keeping the first infrared module and the second infrared module separated by a maximum effective infrared transmission distance.

12. The test method of claim 9, wherein before the step of transmitting and receiving the test data via the infrared transmission circuit, the test method further comprises a step of generating a trigger instruction to the first and second infrared modules to start to transmit and receive the test data via the infrared transmission circuit.

* * * * *